(12) United States Patent
Degenhardt et al.

(10) Patent No.: US 7,797,149 B2
(45) Date of Patent: Sep. 14, 2010

(54) INTEGRATING RELATED DATA FROM INCOMPATIBLE SYSTEMS FOR ENHANCED BUSINESS FUNCTIONALITY

(75) Inventors: Jon R. Degenhardt, Mountain View, CA (US); Peter A. Thorson, Oakland, CA (US); Arjun Chandrasekar Iyer, Foster City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1663 days.

(21) Appl. No.: 10/176,898

(22) Filed: Jun. 20, 2002

(65) Prior Publication Data
US 2007/0244689 A1 Oct. 18, 2007

(51) Int. Cl.
*G06F 17/20* (2006.01)
(52) U.S. Cl. ......................................................... 704/8
(58) Field of Classification Search ................. 704/2–8
See application file for complete search history.

(56) References Cited

U.S. PATENT DOCUMENTS

| | | | |
|---|---|---|---|
| 5,682,158 A | 10/1997 | Edberg et al. ................. 341/90 |
| 5,784,069 A * | 7/1998 | Daniels et al. .............. 345/467 |
| 5,784,071 A * | 7/1998 | Tang et al. .................. 345/467 |
| 5,793,381 A * | 8/1998 | Edberg et al. ............... 345/467 |
| 5,812,964 A * | 9/1998 | Finger ........................... 704/7 |
| 6,349,275 B1 * | 2/2002 | Schumacher et al. ........... 704/8 |
| 6,363,337 B1 | 3/2002 | Amith ........................... 704/7 |
| 6,466,900 B1 * | 10/2002 | Lissauer et al. ................ 704/7 |
| 6,522,999 B2 * | 2/2003 | Fuji .............................. 704/2 |
| 6,754,694 B1 * | 6/2004 | Hiura et al. ................. 709/206 |
| 6,757,688 B1 * | 6/2004 | Leapaldt et al. ............. 707/101 |
| 6,922,812 B2 | 7/2005 | Broussard et al. ........... 715/542 |
| 7,024,365 B1 * | 4/2006 | Koff et al. ................. 704/270.1 |
| 7,051,278 B1 * | 5/2006 | Ehrman ....................... 715/264 |
| 7,165,020 B2 * | 1/2007 | Lissauer et al. ................ 704/7 |
| 7,231,421 B2 * | 6/2007 | Kawakura et al. ........... 709/203 |

(Continued)

FOREIGN PATENT DOCUMENTS

WO       WO0235369 A1 *   5/2002

OTHER PUBLICATIONS

Kawakura (Machine Translation of WO 02/35369A1) pp. 1-26.*

(Continued)

*Primary Examiner*—David R Hudspeth
*Assistant Examiner*—Lamont M Spooner
(74) *Attorney, Agent, or Firm*—Campbell Stephenson LLP (57) ABSTRACT

An embodiment of the present invention describes a method and system for using related data from external systems employing incompatible character sets to affect a business process. For one embodiment, a first external system uses a first character set. A first data set is received from the first external system, the first data set using the first character set. A second external system uses a second character set. A second data set is received from the second external system, the second data set using the second character set. The first data set and the second data set are converted to use a third character set, the third character set a superset of the first character set and the second character set. The first data set and the second data set, as converted and integrated, are then used to effect one or more business processes. For one embodiment, the third character set is Unicode.

19 Claims, 4 Drawing Sheets

U.S. PATENT DOCUMENTS

| | | | |
|---|---|---|---|
| 7,278,100 B1 * | 10/2007 | Ehrman | 715/264 |
| 2003/0014545 A1 | 1/2003 | Broussard et al. | 709/250 |
| 2004/0034521 A1 * | 2/2004 | Kawakura et al. | 704/1 |
| 2004/0044791 A1 * | 3/2004 | Pouzzner | 709/245 |
| 2004/0261024 A1 | 12/2004 | Storisteana | 715/530 |
| 2009/0024384 A1 * | 1/2009 | Kobayashi et al. | 704/8 |

OTHER PUBLICATIONS

Lohrum et al., De-duplication in KOBV, Jun. 8, 1999, SC 99-05, pp. 1-21.*

* cited by examiner

INTEGRATING RELATED DATA FROM INCOMPATIBLE SYSTEMS FOR ENHANCED BUSINESS FUNCTIONALITY

FIELD

Embodiments of the present invention relate generally to the storage of related data in multiple disparate character sets, and more specifically to methods and apparatuses for integrating such data for business functionality.

BACKGROUND

The growing trend toward multinational organizations has given rise to a corresponding need for fast, efficient, and accurate integration of data stored in different computer character sets generally corresponding to different human languages. That is, multinational organizations typically have regionally based information systems. Often these systems cannot share mission critical business information because they store data using incompatible character sets.

Typically in computing systems, the internal representation of characters is designed for one alphabet. For example, a computing system may be designed to represent western European characters corresponding to the languages that use this alphabet (e.g., English, French, German, etc.), but would not be able to represent languages using other characters (Cyrillic, Arabic, Japanese, Chinese, etc.)

Computer representation of characters typically assigns every character of the alphabet a unique numeric value. This means that a character set that represents each character using 8-bits can have only 256 characters. A 256-character character set is sufficient to represent the western European alphabet or Cyrillic (though not concurrently), but is insufficient for languages that employ more characters (e.g., Japanese, Chinese, etc.). Languages having large character sets have employed a two-byte (16 bit) representation of characters. Such character sets may employ a multi-byte encoding, with, for example, the first byte indicating the number of bytes used to represent the character. Such encoding did not provide the capability to combine character sets. So, for example, it was not possible to combine western European and Japanese or Japanese and Chinese character sets.

Unicode was developed to cover the major languages and character sets. Unicode represents each character using 16 bits and therefore can uniquely identify more than 60 thousand characters. This means that a Unicode character set acts as a superset for all the existing character sets for various languages or alphabets.

The majority of extant systems are not Unicode and there is, therefore, a need for conversion between various character sets. A computing system using Unicode can communicate with external computing systems employing various character sets, but there must be a conversion between Unicode and the character set of the external computing system.

The variety of character sets presents difficulties for multinational organizations in accomplishing a number of business processes. For example, a customer of a multinational computer manufacturer may place an order for 1000 PCs, with 200 of the PCs to be delivered to the customer's office in Japan and 800 of the PCs to be delivered to the customer's office in Germany. The customer may place the order from a computing system using a Chinese character set. The computer manufacturer may be receiving orders on a computing system using Unicode that can receive the order, convert the Chinese character set to Unicode the relevant data to its regional facilitates. The computer manufacturer will typically divide the order and place an order for 200 PCs with its Japanese facility and another order for 800 computers with its German facility, Each regional facility will receive the relevant data in Unicode and convert the data to its character set. That is, each of these external systems will store the data in its particular character set (i.e., Japanese and western European, respectively). If the customer wants to check the status of the order this may prove difficult as the order is now dispersed to external systems that may not be able to communicate with each other. So, in this case the business process of order tracking is impeded when an organization uses a network of external systems using different character sets.

Many other business processes depend on having depend on having a unified view of related data that cannot be readily obtained when the data is dispersed among external systems using different character sets.

SUMMARY

An embodiment of the present invention describes a method and system for using related data from external systems employing incompatible character sets to effect a business process. A first external system uses a first character set. A first data set is received from the first external system, the first data set using the first character set. A second external system uses a second character set. A second data set is received from the second external system, the second data set using the second character set. The first data set and the second data set are converted to use a third character set, the third character set a superset of the first character set and the second character set. The first data set and the second data set, as converted and integrated, are then used to effect one or more business processes.

Other features and advantages of the present invention will be apparent from the accompanying drawings, and from the detailed description, that follows below.

BRIEF DESCRIPTION OF THE DRAWINGS

Embodiments of the present invention are illustrated by way of example, and not limitation, by the figures of the accompanying drawings in which like references indicate similar elements and in which.

DETAILED DESCRIPTION

Embodiments of the invention provide a method and system for using related data from external systems employing incompatible character sets to effect a business process. For one embodiment, a Unicode-based computing system receives related data from a number of external systems employing two or more mutually exclusive character sets.

The Unicode-based computing system converts the related data to Unicode. The Unicode data is then used in a business process.

It is an intended advantage of one embodiment of the present invention to convert related data from multiple external systems using different character sets to a single character set. It is a further intended advantage of such an embodiment to use the converted related data to affect various business processes. It is another intended advantage of one embodiment of the present invention to integrate related data from multiple external systems using different character sets.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

In the following detailed description of exemplary embodiments of the present invention, numerous specific details are set forth in order to provide a thorough understanding of the described embodiments of the present invention. However, it will be apparent to one skilled in the art that alternative embodiments of the present invention may be practiced without these specific details. In some instances, well-known structures and devices are shown in block diagram form, rather than in detail, in order to avoid obscuring the description of exemplary embodiments of the present invention.

Figure 1:
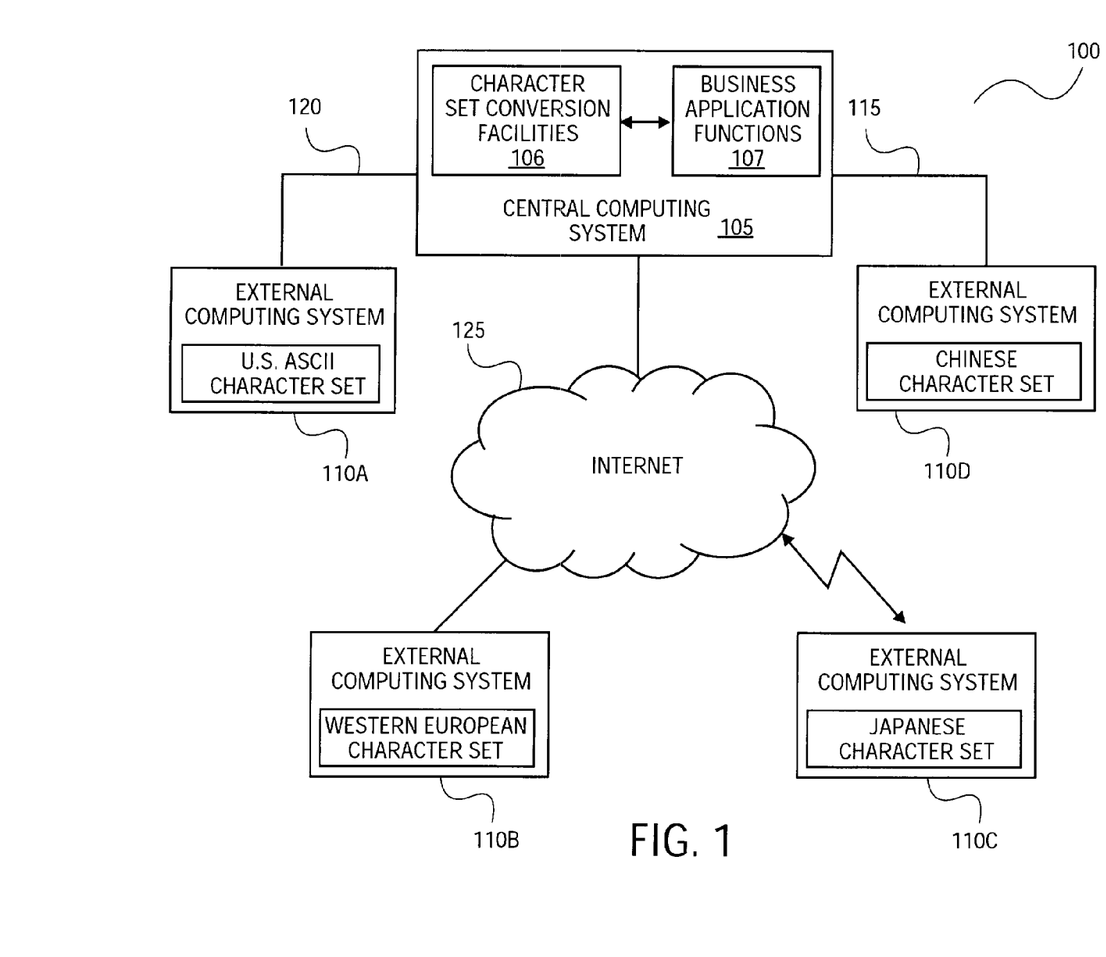
FIG. 1 illustrates a network of computing systems in which the processing of related data from external systems using incompatible character sets to effect a business process may be implemented in accordance with one embodiment of the present invention.

An embodiment of the present invention receives and integrates related data from mutually incompatible systems. The data is converted into a common format (character set) and processed to support a variety of value-added business functions that may not be achieved easily with separate data stores. FIG. 1 illustrates a network of computing systems in which the processing of related data from external systems using incompatible character sets to effect a business process may be implemented in accordance with one embodiment of the present invention. Network 100 includes a computing system 105 employing a Unicode character set. A plurality of local or remote external computing systems 110a-110d are coupled to the central computing system. External computing systems 110a-110d may use various character sets. For example, external computing system 110a may use U.S. ASCII, external computing system 110b may use western European, external computing system 10C may use Japanese, and external computing system 110d may use Chinese. For purposes of illustrating the invention, the computing system 105 employs a Unicode character set. However, it will be evident to one skilled in the art that, in general, an embodiment of the present invention may be used where the central computing system employs a character set that is a superset of the external computing system's character set. For example, for one embodiment of the present invention, the computing system uses a western European character set and an external computing system uses U.S. ASCII. As discussed above, Unicode was designed to be a superset of existing character sets.

The central computing system 105 may be coupled to external computing systems over short distances as part of a local area network (LAN) 115. Additionally or alternatively, the central computing system 105 may be coupled to external computing systems over long distances via telephone lines or satellite links as part of a wide area network 120 (WAN) or over the internet 125. The internet 125 is a network of networks through which information is exchanged via the use of protocols (e.g., TCP, IP) as known in the art.

For purposes of illustrating an embodiment of the invention, network 100 may be viewed as the computer network of a multinational organization having a computing system 105 using a Unicode character set and a several regional computing systems each using one of a variety of other character sets. Related data stored on regional computing systems may contain incompatible characters (characters from different character sets). For example, external computing system 110b may represent a regional computing system in Germany having data stored thereon using a western European character set. External computing system 110c, representing a regional computing system in Japan, may store data related to the data stored on external computing system 110b using a Japanese character set. The related data on external computing systems 110b and 110c is transmitted to Unicode-based computing system 105. The related data is converted from its original character set format to a Unicode format using character set conversion facilities 106. The data, now in compatible format, may be used by the business application functions 107 to support a variety of business processes including inventory and order management, sales forecasting, and marketing evaluation, among others.

Figure 2:
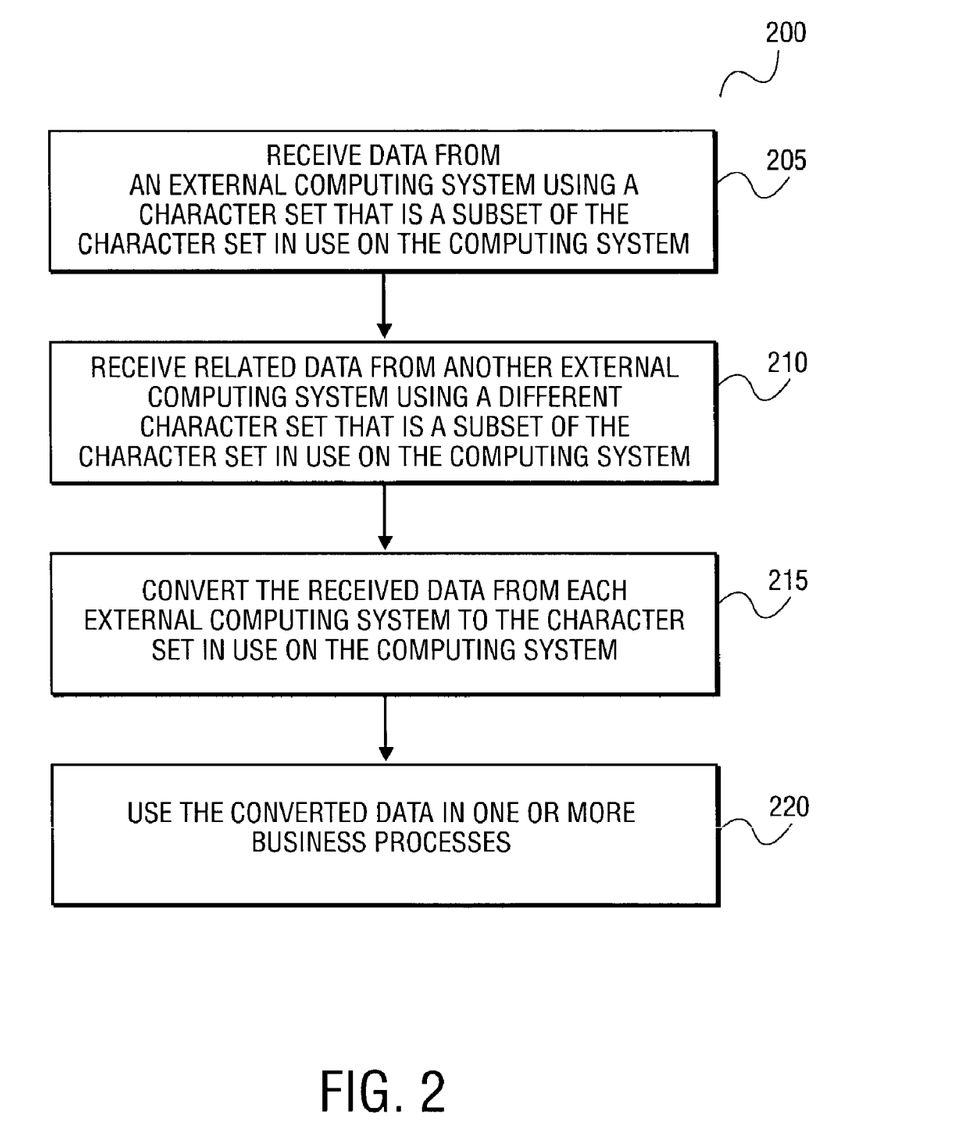
FIG. 2 is a process flow diagram in accordance with one embodiment of the present invention.

FIG. 2 is a process flow diagram in accordance with one embodiment of the present invention. Process 200 begins at operation 205 in which a Unicode-based computing system receives data from an external computing system using a character set that is a subset of Unicode (e.g., western European). The data pertains, or is related, to a business process, that is, the western European data may be inventory data for a specified product.

At operation 210 the Unicode-based computing system receives data from another external computing system using a different character set that is likewise a subset of Unicode (e.g., Japanese). The Japanese data is related to the western European data. That is, for example, the Japanese data is also inventory data for the specified product.

At operation 215 the Unicode-based computing system converts the data received from each external system to Unicode. The conversion of the received data from the respective character sets of the external systems to Unicode may be accomplished with a variety of techniques. For example, one common method is the table lookup method. The table lookup method indexes the characters in each character set (e.g., Unicode and U.S. ASCII), and maps the index value of a particular character of one character set to the index value of that character in another character set.

At operation 220 the related data, now in Unicode format, is used in one or more business processes. Some exemplary business processes include: sales pipeline analysis and forecasting, inventory management, product configuration, order management, and unified customer view, which are described in more detail below.

Sales Pipeline Analysis and Forecasting

Pipeline analysis and forecasting tracks sales opportunities throughout the corporation by metrics such as sales pipeline stage, revenue opportunity, probability of close, etc. Data is collected for individual sales opportunities and the aggregated data is analyzed to generate sales forecasts, revenue projects and other analysis of the sales pipeline. In a global organization this information is assembled by regionally based sales teams using regionally based computing systems. Data from regionally based computer systems is "rolled up" to a corporate computing system, aggregating sales pipeline data to provide a comprehensive, company wide analysis.

Data received from regionally based computing systems will often use restricted character sets specific to the region. An embodiment of the present invention allows data using character sets that are incompatible with character sets used by other regionally based systems to be converted to use a common character set and aggregated into the corporate wide roll up and analysis.

Inventory Management

Inventory management is the process of managing and monitoring products and components in warehouses. A global corporation will have product inventory in warehouses in different countries and regions. Locally based inventories are often managed by regionally based computer systems. Often these computer systems will use regionally based character sets incompatible with the character sets of other regional based inventory systems. In one embodiment, a corporate wide view of product and component inventory involves receiving the data from these regionally based computing facilities, converting the data to use a character set that is a superset of all the more restrictive character sets, and aggregating it into a common data store where inventory business processing software can operate on it.

Product Configuration

Product configuration is part of a sales process that involves selecting, configuring, and purchasing complex goods and services to create quotes and orders specific to the needs of particular customers. In a complex, global organization, a configured product may consist of many subcomponents. Detailed information about these subcomponents may be stored in different regionally based computer systems within one organization, or may be in the computer systems of partner organizations. Being able to create a correctly configured product requires receiving and aggregating the data in from these computer systems, which often use incompatible character sets. For one embodiment, the data using incompatible character sets is converted to use a common character set to facilitate product configuration.

Order Management

Order management is the process of creating quotes and orders for products and tracking the process of fulfillment, snipping, and other aspects of the product purchase lifecycle. Complex product orders will often involve multiple products or sub products, and multinational customers may place a single order for multiple products with multiple shipping destinations spanning several regions. The shipping and fulfillment process in these situations involves sending sub-pieces of the product order and shipping information to regionally based computing systems that track the actual movement of the order locally. These regional systems may span organizational boundaries, and will often use mutually incompatible character sets. Information about the status of the sub pieces of the full order is received from these regionally based systems. In one embodiment of the present invention, providing a comprehensive view of the order requires reassembling the information from these regional system back into a single view, and in the process converting the data from these character set incompatible systems into a superset character set that can represent the data from all the systems.

Unified Customer View

Information about customers is stored in many separate computing systems in a corporate computing enterprise. Interaction with an individual customer or account is very diverse, spanning multiple communication channels and multiple purposes. In multinational corporations these individual computing system spans multiple regions as well. Multinational companies are themselves customers, creating a complex relationship between the customer and the selling organization. For example, a multinational customer will have local contacts in different regions who interact with the local sales staff of the selling organization based in the same region. The same is true of field service interactions and other interactions. At the same time, the local contacts for a multinational customer may also interact with central functions of the selling organization, and these organizations will interact at the corporate level also. The computing systems managing these customer relationships are varied as well, and many will exist in the local regional offices of the selling organization. The customer data maintained in these local systems will be maintained in the language of region, everything from name and address of individual account contacts to product orders, future sales prospects, customer service history, etc. At the corporate level, it is important to have a unified view of these customer accounts. The regionally based computing systems maintaining this information often use restricted character sets that are mutually incompatible with the character sets of the other regionally based computing systems. For one embodiment, providing a unified view of the customer includes receiving the data from the regionally based computing systems, converting the data to a superset character set that can represent the characters from all the regional systems, and aggregating the data into a common data store that can be viewed and accessed through a cohesive mechanism.

Figure 3:
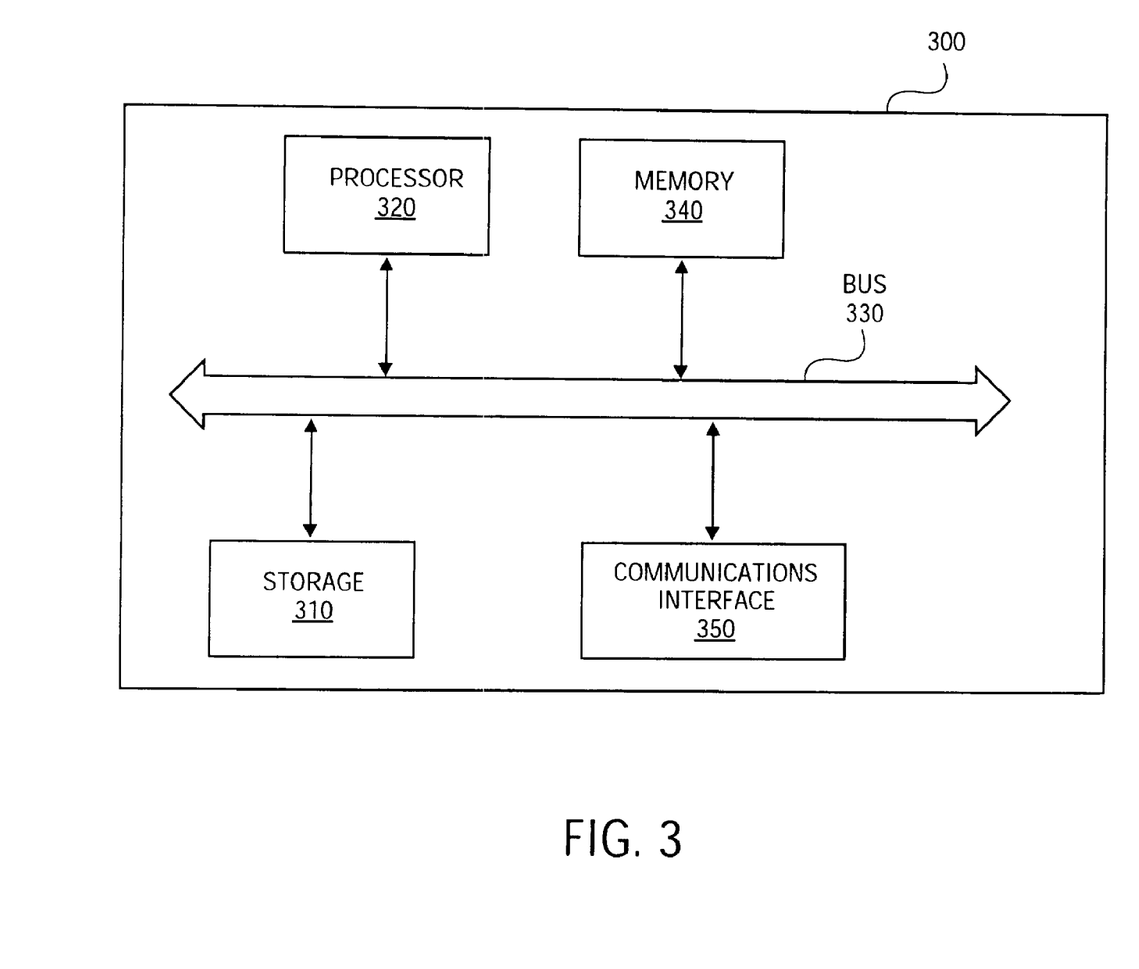
FIG. 3 illustrates a computing system that may represent a central computing system or external computing system in accordance with one embodiment of the present invention.

FIG. 3 illustrates a computing system that may represent a central computing system or external computing system in accordance with one embodiment of the present invention. The method of the present invention may be implemented on the computing system shown in FIG. 3. The computing system 300, shown in FIG. 3, includes a storage unit 310. Storage unit 310 contains one or more sets of storage devices for storing data using Unicode or other character sets. The storage devices may be magnetic or optical storage media. Computing system 300 also includes one or more processors, shown collectively as the processor 320. The processor 320 may include a control unit, arithmetic unit and several registers with which to process information. The storage unit 310 communicates with the processor 320 via a bus 330 that may be a standard bus for communicating information and signals. The processor 320 is capable of responding to commands and provides the capability for computing system 300 to perform tasks and execute software programs stored within storage unit 310. The process of receiving incompatible related data, converting it into a common format, and using the converted data in a business process in accordance with the present invention may be implemented by hardware and/or software contained within the computing system. For example, memory 340, also coupled to the bus 330, may be used for storing program code that may be executed by the processor 320. Memory 340 may be random access memory (RAM) or some other machine-readable medium. The machine-readable medium may include a mechanism that provides (i.e., stores and/or transmits) information in a form readable by a machine such as computer or digital processing device. For example, a machine-readable medium may include a read only memory (ROM), random access memory (RAM), magnetic disk storage media, optical storage media, flash memory devices. The code or instructions may be represented by carrier-wave signals, infrared signals, digital signals, and by other like signals. Computing system 300 also includes a communication interface 350 also coupled to bus 330 for interfacing computing system 300 with other computing systems in a network as described above in reference to FIG. 1.

Figure 4:
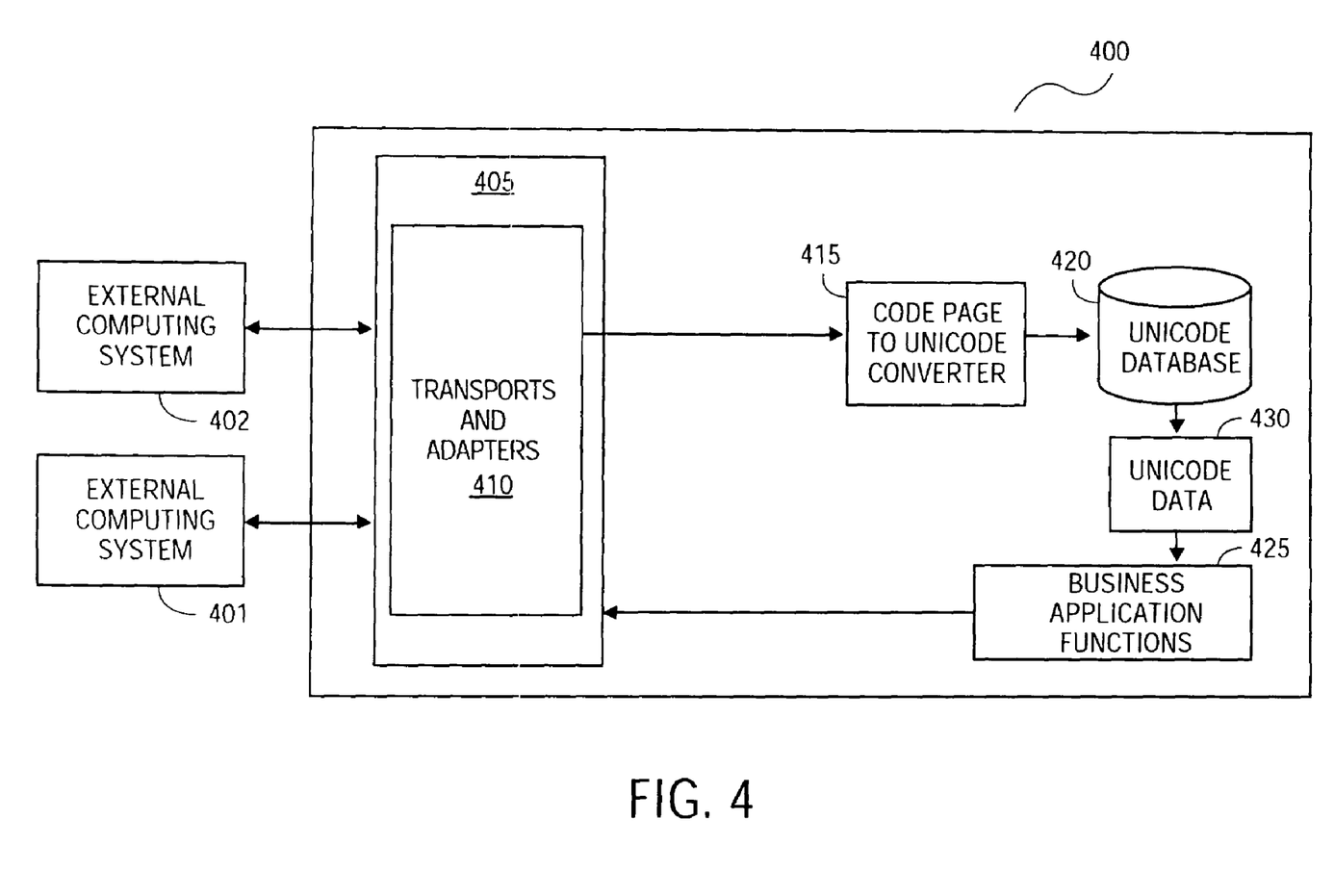
FIG. 4 illustrates a software media diagram for a Unicode-based computing system in accordance with one embodiment of the present invention.

FIG. 4 illustrates a software media diagram for a Unicode-based computing system in accordance with one embodiment of the present invention. Software media 400 includes an application server 405 that uses a set of transports and adapters 410 to communicate with external computing systems 401 and 402.

The external computing systems 401 and 402 store related data using different data formats (character sets). For example, external computing system 401 using a western European character set may store data pertaining to an organization's product sales in Germany, while external computing system 402 using a Japanese character set may store data pertaining to the organization's product sales in Japan. This data is transmitted to the Unicode-based computing system, in its original data format. The transports and adapters 410 use the character set conversion facilities 415 to convert data received from external computing systems to common Unicode format. The related data from external computing systems 401 and 402, now in Unicode format is stored to the Unicode-based computing system's Unicode database 420 by the application server 405.

The business application function 425 use the related data in Unicode format 430 to effect business processes as described above. The processed and integrated business data may then be provided to external computing systems through application server 405.

In the foregoing specifications, the invention has been described with reference to specific exemplary embodiments thereof. It will, however, be evident that various modifications and changes may be made thereto without departing from the broader spirit and scope of the invention as set forth in the appended claims. The specification and drawing are, accordingly, to be regarded in an illustrative sense rather than a restrictive sense.

What is claimed is:

1. A method comprising:
    receiving a first data set from a first external system, wherein
        the first external system is configured to
            use a first character set to encode the first data set,
            store the first data set as encoded in the first character set, and
            supply the first data set for conversion and storage in a common store
    receiving second data set from a second external system, wherein
        the second data set is related to the first data set
        the second external system is configured to
            use a second character set to encode the second data set,
            store the second data set as encoded in the second character set, and
            supply the second data set for conversion and storage in the common store, and
        the first external system and the second external system are mutually incompatible by virtue of the first and second character sets being mutually incompatible;
    converting the first data set encoded in the first character set into a converted first data set encoded in a third character set, wherein
        the third character set is a superset of the first character set and the second character set, and
        the first, second, and third character sets are different from one another;
    converting the second data set encoded in the second character set into a converted second data set encoded in the third character set;
    integrating the converted first data set and the converted second data set into a third data set, wherein
        the integrating comprises discarding redundant information; and
    facilitating access to contents of the first data set and the second data set by storing the third data set in the common store.

2. The method of claim 1 further comprising:
    using the first set of data and the third set of data to effect a business process.

3. The method of claim 2 further comprising:
    generating a unified view of the first data set and the third data set.

4. The method of claim 3, wherein the business process comprises order management, inventory management, product configuration, sales forecasting, and marketing management.

5. The method of claim 3, wherein the third character set is Unicode.

6. The method of claim 5, wherein the first character set and the second character set are mutually exclusive character sets selected from a group consisting of U.S. ASCII, western European, Cyrillic, Arabic, Greek, Japanese, and Chinese.

7. The method of claim 2, wherein the effecting a business process comprises
    processing the third data set to produce business data, and
    providing the business data to the first external system and the second external system.

8. A computing system comprising:
    a processor, the processor having circuitry to execute instructions;
    a communications interface coupled to the processor, wherein
        the communications interface is configured to allow the processor to exchange data with a plurality of external computing systems, and
        at least two of the external computing systems of the plurality are mutually incompatible by virtue of the first and second character sets being mutually incompatible;
    a computer-readable storage medium, coupled to the processor, storing executable instructions which, when executed by the processor, cause the computing system to perform the following:
        receive a data set of a plurality of data sets from each of the plurality of external computing systems, wherein
            each of the external computing systems is configured to use a corresponding character set of a plurality of character sets,
            the character sets are mutually exclusive,
            each corresponding character set corresponds to a one of the external computing systems,
            the received data sets are related,
            each of the character sets is a subset of a superset character set, and
            each external computing system of the external computing systems is configured to
                use the corresponding character set to encode the corresponding data set, and
                store the corresponding data set as encoded in a respective one of the mutually exclusive character sets, convert the received data sets encoded in their corresponding character sets into converted data sets encoded in the superset character set format, wherein all character sets of the character sets and the superset character set are different from each other, and integrate the converted data sets into an integrated data set, wherein the integrating comprises discarding redundant information; and a common store wherein the common store is configured to store the integrated data set that is a superset of the received data sets, the each external computing system of the external computing systems is further configured to supply the corresponding data set for conversion and storage in the common store, and the common store is configured to facilitate access to contents of the received data sets using the superset character set.

9. The computing system of claim 8, wherein the received data sets, converted to the superset character set format, are used for a business process.

10. The computing system of claim 9, wherein the executable instructions, when executed by the processor, further cause the computing system to present a unified view of the data from the received data sets.

11. The computing system of claim 10, wherein the business process comprises order management, inventory management, product configuration, sales forecasting, and marketing management.

12. The computing system of claim 10, wherein the superset character set is Unicode.

13. The computing system of claim 11, wherein each of the mutually exclusive character sets are selected from the group consisting of U.S. ASCII, western European, Cyrillic, Arabic, Greek, Japanese, and Chinese.

14. A computer-readable storage medium that provides an executable computer program, which, when executed by a computing system, causes the computing system to perform a method comprising:

receiving a first data set from a first external system, wherein the first external system is configured to use a first character set to encode the first data set, store the first data set as encoded in the first character set, and supply the first data set for conversion and storage in a common store receiving a second data set from a second external system, wherein the second external system is configured to use a second character set to encode the second data set, store the second data set as encoded in the second character set, and supply the second data set for conversion and storage in the common store, the second data set is related to the first data set, and the first external system and the second external system are mutually incompatible by virtue of the first and second character sets being mutually incompatible;

converting the first data set encoded in the first character set into a converted first data set encoded in a third character set, wherein the third character set is a superset of the first character set and the second character set, and the first, second, and third character sets are different from one another;

converting the second data set encoded in the second character set into a converted second data set encoded in the third character set;

integrating the converted first data set and the converted second data set into a third data set, wherein the integrating comprises discarding redundant information; and facilitating access to contents of the first data set and the second data set by storing the third data set in the common store.

15. The computer-readable storage medium of claim 14, wherein the first data set and the third data set are used to effect a business process.

16. The computer-readable storage medium of claim 15 further comprising:

presenting a unified view of the first data set and the third data set.

17. The computer-readable storage medium of claim 16, wherein the business process comprises order management, inventory management, product configuration, sales forecasting, and marketing management.

18. The computer-readable storage medium of claim 17, wherein the third character set is Unicode.

19. The computer-readable storage medium of claim 18, wherein the first character set and the second character set are mutually exclusive character sets selected from the group consisting of U.S. ASCII, western European, Cyrillic, Arabic, Greek, Japanese, and Chinese.

* * * * *

UNITED STATES PATENT AND TRADEMARK OFFICE
CERTIFICATE OF CORRECTION

PATENT NO. : 7,797,149 B2  
APPLICATION NO. : 10/176898  
DATED : September 14, 2010  
INVENTOR(S) : Jon R. Degenhardt et al.

Page 1 of 1

It is certified that error appears in the above-identified patent and that said Letters Patent is hereby corrected as shown below:

On the first page, in field (57), line 11, delete "set a" and insert -- set is a --, therefor.

In column 1, line 66, delete "Unicode the" and insert -- Unicode, and provide the --, therefor.

In column 1, line 67, delete "facilitates" and insert -- facilities --, therefor.

In column 2, line 3, delete "facility," and insert -- facility. --, therefor.

In column 2, line 13, after "depend" delete "on having depend".

In column 2, line 30, delete "set a" and insert -- set is a --, therefor.

In column 3, line 48, delete "10C" and insert -- 110C --, therefor.

In column 5, line 42, delete "snipping," and insert -- shipping --, therefor.

In column 7, line 17, delete "to" and insert -- to the --, therefor.

In column 7, line 22, delete "function" and insert -- functions --, therefor.

In column 7, line 27, delete "specifications," and insert -- specification, --, therefor.

In column 7, line 32, delete "drawing" and insert -- drawings --, therefor.

In column 7, line 46, in claim 1, delete "receiving" and insert -- receiving a --, therefor.

In column 7, line 48, in claim 1, delete "first data set" and insert -- first data set, --, therefor.

In column 9, line 48, in claim 14, delete "store" and insert -- store; --, therefor.

Signed and Sealed this  
Second Day of August, 2011

David J. Kappos  
*Director of the United States Patent and Trademark Office*